United States Patent [19]

Saito et al.

[11] Patent Number: 5,134,850

[45] Date of Patent: Aug. 4, 1992

[54] EXHAUST SYSTEM OF AN INTERNAL COMBUSTION ENGINE

[75] Inventors: Yoshiharu Saito, Susono; Yoshihiro Iwashita, Sunto, both of Japan

[73] Assignee: Toyota Jidosha Kabushiki Kaisha, Japan

[21] Appl. No.: 646,206

[22] Filed: Jan. 28, 1991

[30] Foreign Application Priority Data

Feb. 3, 1990 [JP] Japan ................................. 2-23638

[51] Int. Cl.⁵ .......................... F02B 27/02; F01L 1/34
[52] U.S. Cl. ................................. 60/313; 123/90.16
[58] Field of Search ............... 60/313, 312; 123/90.15, 123/90.16

[56] References Cited

U.S. PATENT DOCUMENTS

| | | | |
|---|---|---|---|
| 1,755,817 | 4/1930 | Dibley | 123/90.16 |
| 4,231,330 | 11/1980 | Garcea | 123/90.15 |
| 5,050,378 | 9/1991 | Clemmens | 60/313 |

FOREIGN PATENT DOCUMENTS

| | | | |
|---|---|---|---|
| 2852736 | 6/1980 | Fed. Rep. of Germany | 60/313 |
| 57-148023 | 9/1982 | Japan . | |
| 57-148024 | 9/1982 | Japan . | |
| 60-27710 | 2/1985 | Japan . | |
| 60-128937 | 8/1985 | Japan . | |
| 61-145806 | 9/1986 | Japan . | |
| 212622 | 9/1986 | Japan | 60/313 |

Primary Examiner—Douglas Hart
Attorney, Agent, or Firm—Oliff & Berridge

[57] ABSTRACT

An internal combustion engine having a valve overlapping period control device for controlling a valve overlapping period during which both the intake valve and the exhaust valve are open, and an equivalent length adjustment device for controlling an equivalent length of an exhaust passage necessary to cause an exhaust gas pulsation to return to an exhaust port in the form of a vacuum during the valve overlapping period, to thereby reduce the equivalent length as an engine speed increases when the valve overlapping period is longer than a predetermined period, and for stopping a control of the equivalent length when the valve overlapping period is shorter than the predetermined period.

5 Claims, 8 Drawing Sheets

EXHAUST SYSTEM OF AN INTERNAL COMBUSTION ENGINE

BACKGROUND OF THE INVENTION

1. Field of the Invention

The present invention relates to an exhaust system of an internal combustion engine.

2. Description of the Related Art

Japanese Unexamined Patent Publication No. 60-27710 discloses a valve timing control device for controlling the timing of an opening and a closing of an intake valve. In this device, when the opening timing of the intake valve is advanced, a valve overlapping period, during which both the intake valve and an exhaust valve are open, is prolonged, and thus a problem arises in that an amount of air fed into a cylinder during an intake stroke is reduced because burnt gas remaining in the cylinder flows backward toward the intake port.

SUMMARY OF THE INVENTION

An object of the present invention is to provide an exhaust system of an internal combustion engine by which the above problems are solved.

According to the present invention, there is provided an internal combustion engine having an intake valve and an exhaust valve, comprising: a valve overlapping period control means for controlling a valve overlapping period during which both the intake valve and the exhaust valve are open; and an equivalent length adjustment means for controlling an equivalent length of an exhaust passage necessary to cause an exhaust gas pulsation to return to an exhaust port in the form of a vacuum during the valve overlapping period, to reduce the equivalent length as an engine speed increases when the valve overlapping period is longer than a predetermined period, and for stopping the control of the equivalent length when the valve overlapping period is shorter than the predetermined period.

The present invention may be more fully understood from the description of preferred embodiment of the invention set forth below, together with the accompanying drawings.

DESCRIPTION OF THE PREFERRED EMBODIMENTS

Figure 1:
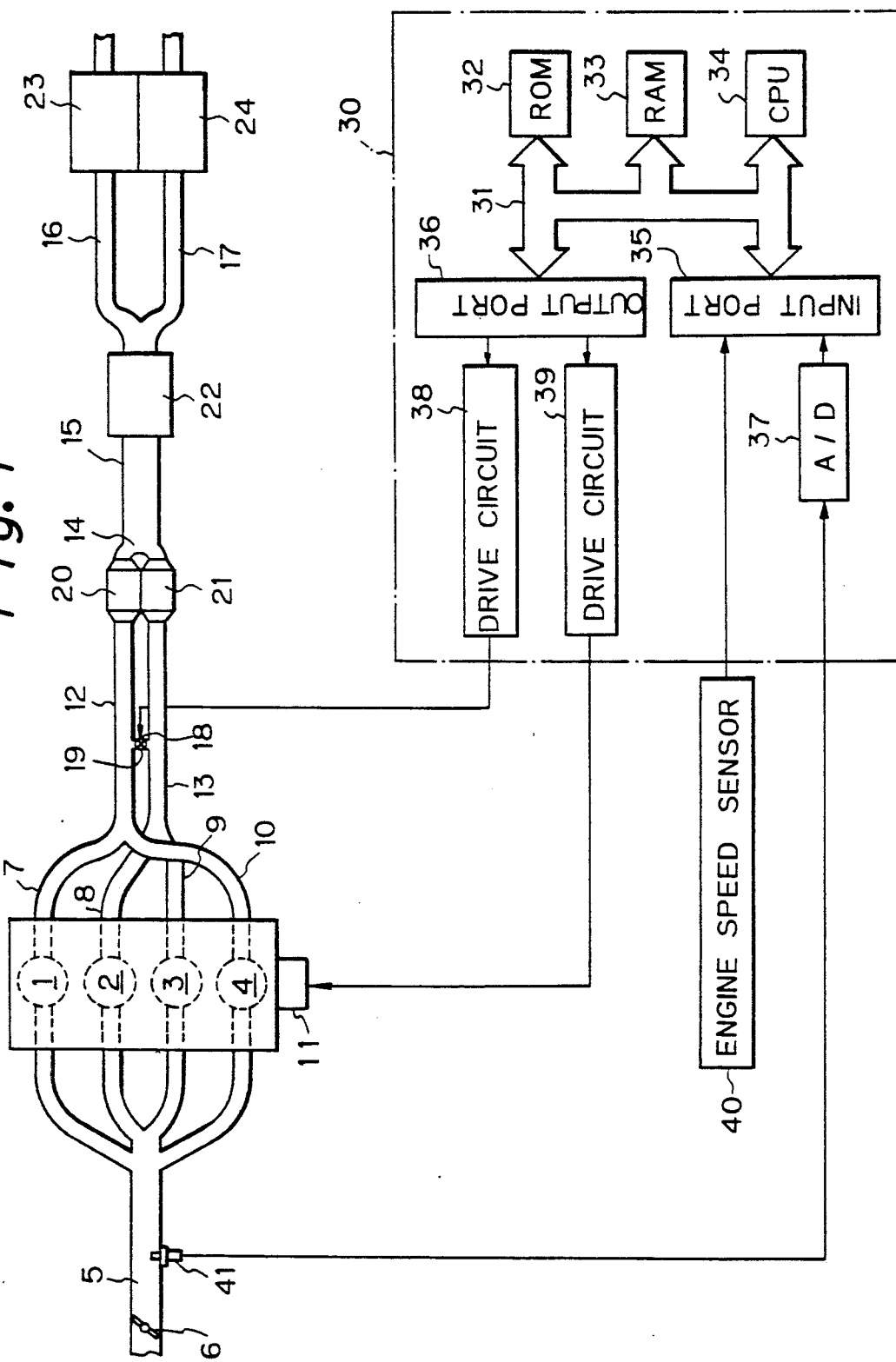
FIG. 1 is an overall view of a four-cylinder engine having an exhaust device according to the present invention.

Referring to FIG. 1, reference numerals 1 to 4 designate first to fourth cylinders, 5 is an intake pipe, 6 is a throttle valve arranged in the intake pipe 5, 7 to 10 are first to fourth exhaust branch pipes connected to the first to fourth cylinders 1 to 4 respectively, and 11 is a valve timing control device for controlling a timing of an opening and closing of an intake valve. The first exhaust branch pipe 7 and the fourth exhaust branch pipe 10 are merged and connected to a first merging pipe 12, and the second exhaust branch pipe 8 and the third exhaust branch pipe 9 are merged and connected to a second merging pipe 13. The first merging pipe 12 and the second merging pipe 13 are merged at a merging portion 14 and connected to an exhaust pipe 15, which is divided into two divergent pipes 16 and 17. The sectional area of the exhaust pipe 15 is substantially twice as large as each sectional area of the first merging pipe 12 and the second merging pipe 13, and accordingly the sectional area is rapidly increased at the merging portion 14, and therefore, an exhaust gas pulsation is reflected at the merging portion 14. The first merging pipe 12 and the second merging pipe 13 are connected by a communication pipe 18, and a control valve 19 for opening and closing the communication pipe 18 is arranged in the communication pipe 18. When the control valve 19 is opened, since the first merging pipe 12 is communicated with the second merging pipe 13 by the communication pipe 18, the sectional area of the first merging pipe 12 is substantially and rapidly increased, and the sectional area of the second merging pipe 13 is also substantially rapidly increased. Accordingly, when the control valve 19 is opened, an exhaust gas pulsation is reflected at the connecting portion connected to the communication pipe 18.

Namely, when the control valve 19 is closed, an exhaust gas pulsation is reflected at the merging portion 14.

On the other hand, when the control valve 19 is opened, an exhaust gas pulsation is reflected at the connecting portion connected to the communication pipe 18.

The catalysts 20 and 21 are arranged in the first and second merging pipes 12 and 13, respectively, near the merging portion 14, a sub muffler 22 is arranged in the exhaust pipe 15, and main mufflers 23 and 24 are arranged in the divergent pipes 16 and 17 respectively. The capacities of the sub muffler 22 and the main mufflers 23 and 24 are large, and thus an average back pressure in an exhaust passage can be reduced.

When the engine speed is low, the length of each of the exhaust passages from each exhaust valve (not shown) at each of the cylinders 1-4 to the merging portion 14 represents an equivalent length. Accordingly, when the engine speed is low and the control valve 19 is closed, an exhaust gas pulsation is reflected at the merging portion 14 and is returned to the exhaust port in the form of a vacuum, during the valve overlapping period in which both the intake valve and the exhaust valve are open.

On the other hand, when the engine speed is an intermediate speed, the length of each of the exhaust passages from each exhaust valve to the connecting portion connected to the communication pipe 18 represents the equivalent length. Accordingly, when the engine speed is an intermediate speed and the control valve 19 is opened, an exhaust gas pulsation is reflected at the connecting portion connected to the communication pipe 18 and is returned to the exhaust port in the form of a vacuum, during the valve overlapping period. The length of each of the exhaust passages from each exhaust valve to the merging portion 14 is about twice as long as the length of each of the exhaust passages from each exhaust valve to the connecting portion connected to the communication pipe 18.

In FIG. 1, the electronic control unit 30 is constructed as a digital computer and comprises a ROM (read only memory) 32, a RAM (random access memory) 33, a CPU (microprocessor, etc.) 34, an input port 35, and an output port 36. The ROM 32, the RAM 33, the CPU 34, the input port 35, and the output port 36 are interconnected via a bidirectional bus 31. An engine speed sensor 40 for detecting an engine speed is connected to the input port 35, and an absolute pressure sensor 41 for detecting an absolute pressure in the intake pipe 5 is also connected to the input port 35, via an AD converter 37.

The output port 36 is connected to the control valve 19 and the valve timing control device 11, via corresponding drive circuits 38 and 39.

Figure 2:
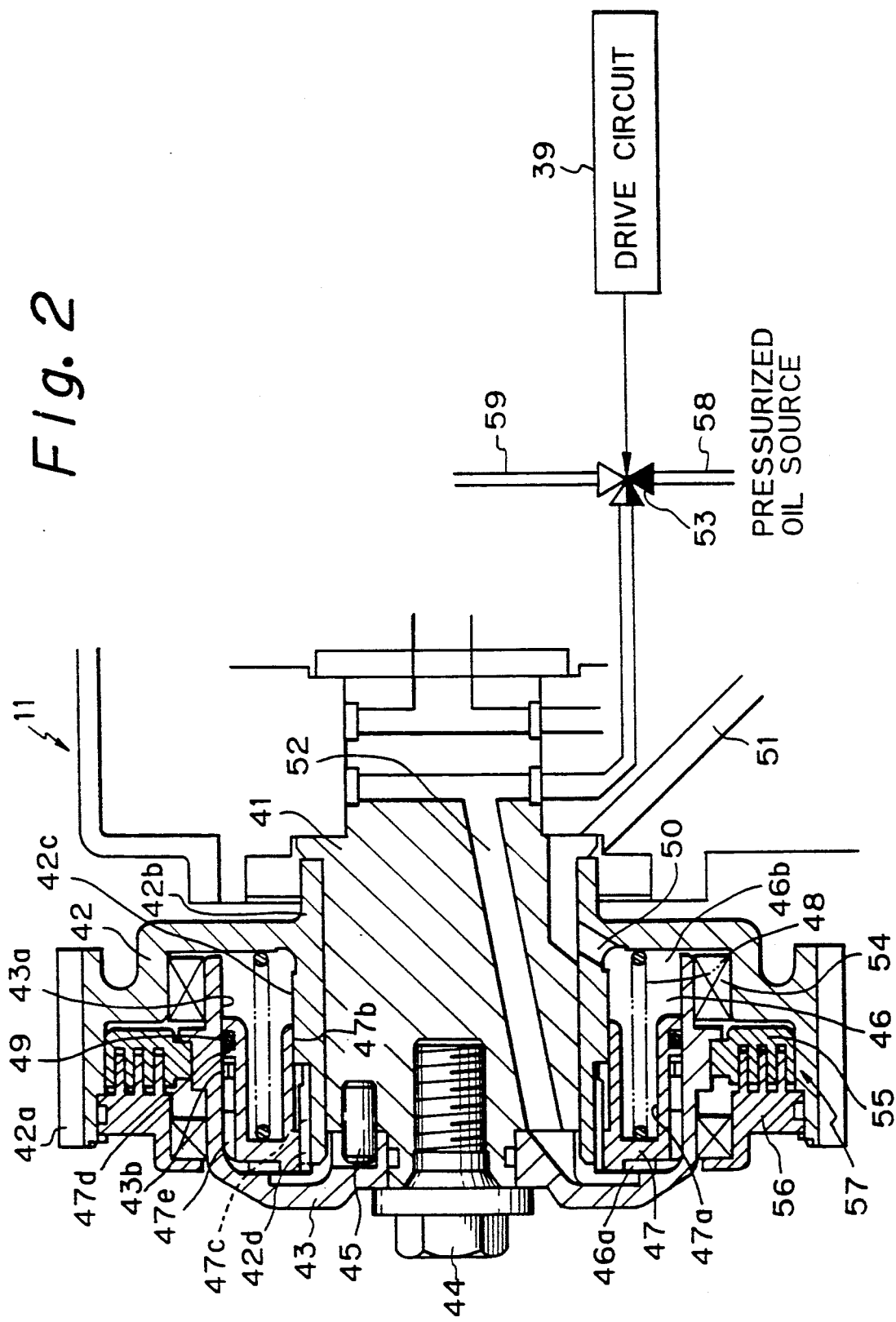
FIG. 2 is a cross-sectional side view of a valve timing control device.

FIG. 2 shows the valve timing control device 11. Referring to FIG. 2, 41 designates a cam shaft, 42 a cam pulley, and 43 a casing. A cam (not shown) for opening and closing the intake valve (not shown) is formed on the right side of the cam shaft 41, and accordingly, the intake valve is opened and closed by the rotation of the cam shaft 41. Teeth 42a with which a toothed belt (not shown) is engaged are formed on the outer circumferential face of the cam pulley 42, and thus the cam pulley 42 is rotated by a crank shaft (not shown) via the toothed belt. Note, an inner circumferential part 42b of the cam pulley 42 is in the form of a cylinder, and thus the inner circumferential part 42b is called a cylindrical part. The cam shaft 41 is rotatably fitted into the cylindrical part 42b, and the left end of the cam shaft 41 is connected to the casing 43 by a bolt 44, and the cam shaft 41 and the casing 43 are joined by a key 45, and thus are rotated as one body. The casing 43 has a cup shape, and the cam pulley 42 and casing 43 are arranged such that the outer circumferential face 42c of the cylindrical part 42b of the cam pulley 42 is directed toward the inner circumferential face 43a of the casing 43, whereby a substantially circular annular piston chamber 46 is formed between the outer circumferential face 42c of the cylindrical part 42b of the cam pulley 42 and the inner circumferential face 43a of the casing 43. A substantially circular annular piston 47 is slidably arranged in the piston chamber 46, and the piston chamber 46 is divided into a pressure chamber 46a and a spring chamber 46b by the piston 47. A recess portion 47a of the piston 47 is arranged in the spring chamber 46b, and a compression coil spring 48 is arranged in the spring chamber 46b and urges the piston 47 always to the left. A right side portion of an inner circumferential face 47b of the piston 47 is in contact with the outer circumferential face 42c of the cylindrical part 42b of the cam pulley 42. A helical gear 47c is formed on the left side portion of the inner circumferential face 47b of the piston 47, and this helical gear 47c engages with the helical gear 42d formed on the outer circumferential face 42c of the cylindrical part 42b of the cam pulley 42, whereby the rotational force of the cam pulley 42 is transmitted to the piston 47. A seal ring 49 is arranged between the right side portion of the outer circumferential face 47d of the piston 47 and the inner circumferential face 43a of the casing 43, to prevent oil leaks at the seal ring 49. A helical gear 47e is formed on the left side portion of the outer circumferential face 47d of the piston 47 and engages with a helical gear 43b formed on the inner circumferential face 43a of the casing 43, whereby the rotational force of the piston 47 is transmitted to the casing 43. The spring chamber 46b is connected to an oil pan (not shown) via drain passages 50 and 51, and the pressure chamber 46a is connected to a switching valve 53 via an oil passage 52. A bearing 54 is arranged between the outer circumferential face of casing 43 and the cam pulley 42, to enable a rotation of the casing 43 and the cam pulley 42. A damper element 55 is fixed on the outer circumferential face of the casing 43, and a damper element 56 is fixed on the cam pulley 42 and arranged against the damper element 55. The aperture between the damper elements 55 and 56 is filled with silicon oil, and thus the damper elements 55 and 56 constitute a damper 57.

When the cam pulley 42 is rotated by a toothed belt (not shown), the rotational force of the cam pulley 42 is transmitted to the cam shaft 41 via the piston 47 and casing 43.

The switching valve 53 is connected to a pressurized oil source (not shown) via an oil supply passage 58, and is connected to the oil pan (not shown) via a return passage 59. The switching valve 53 is connected to the drive circuit 39 and is controlled by the electronic control unit 30 (see FIG. 1). When the switching valve 53 is ON, the oil passage 52 is communicated with the oil supply passage 58, and thus the pressurized engine oil is supplied to the pressure chamber 46a. When the pressurized oil is supplied to the pressure chamber 46a, since the oil pressure acts on the left side face of the piston 47, the piston 47 is moved rightward against the spring force of the compression coil spring 48. When the piston 47 is moved rightward, the piston 47 is rotated relative to the cam pulley 42, in the direction of rotation of the cam pulley 42, by the helical gears 42d and 47c, and the casing 43 is rotated relative to the piston 47, in the direction of rotation of the piston 47, by the helical gears 47e and 43b. Accordingly, when the piston 47 is moved rightward, the cam shaft 41 is rotated relative to the cam pulley 42, in the direction of rotation of the cam pulley 42. At this time, the amount of rotation of the cam shaft 41 is equal to the sum of the amount of rotation of the piston 47 and the amount of rotation of the casing 43, and therefore, the timing of the opening and closing of the intake valve is advanced in accordance with the amount of rotation of the cam shaft 41. Note, this valve timing is an advanced valve timing.

On the other hand, when the switching valve 53 is OFF, the oil passage 52 is communicated with the oil return passage 59, and thus the pressurized oil in the pressure chamber 46a is returned to the oil pan via the oil return passage 59. Therefore since the oil pressure in the pressure chamber 46a becomes low, the piston is moved leftward by the compression coil spring 48 (see FIG. 2). When the piston 47 is moved leftward, the cam shaft 41 is rotated relative to the cam pulley 42, in the direction opposite to the direction of rotation of the cam pulley 42, and therefore, the timing of the opening and closing of the intake valve is retarded. Note, this valve timing is a normal valve timing.

Figure 3:
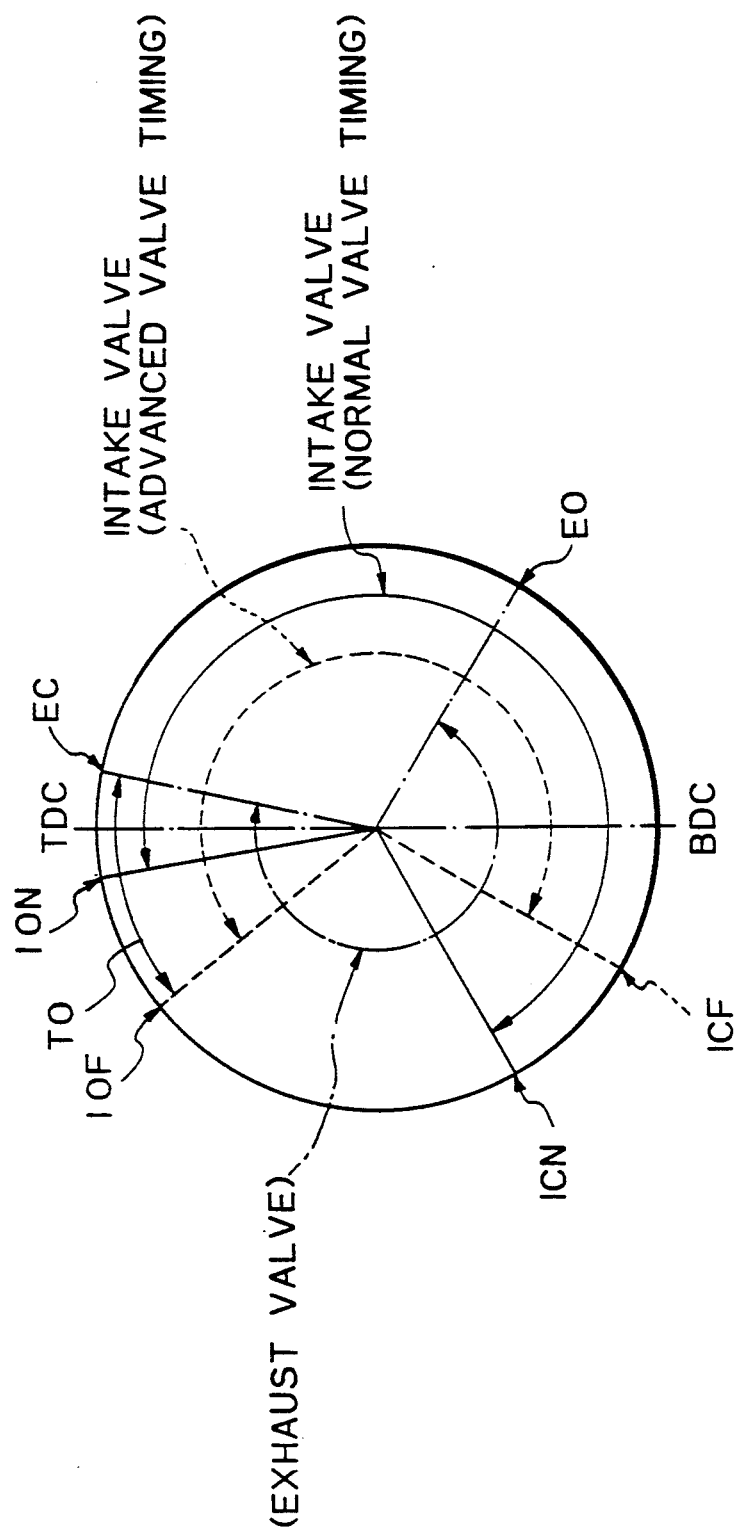
FIG. 3 and FIG. 4 are diagrams illustrating the timings of the opening and closing of the intake valve and the exhaust valve.

FIG. 3 illustrates the timings of the opening and closing of the intake valve and the exhaust valve. Referring to FIG. 3, at the normal valve timing, the intake valve is opened 10 degrees (ION) before top dead center (TDC) during the exhaust stroke and closed 60 degrees (ICN) after bottom dead center (BDC) during the intake stroke. At the advanced timing, the intake valve is opened 40 degrees (IOF) before TDC during the exhaust stroke and closed 30 degrees (ICF) after BDC during the intake stroke. The timing of the opening and closing of the exhaust valve is constant. Namely, the exhaust valve is opened 60 degrees (EO) before BDC during the exhaust stroke and closed 10 degrees (EC) after TDC during the exhaust stroke.

Figure 4:
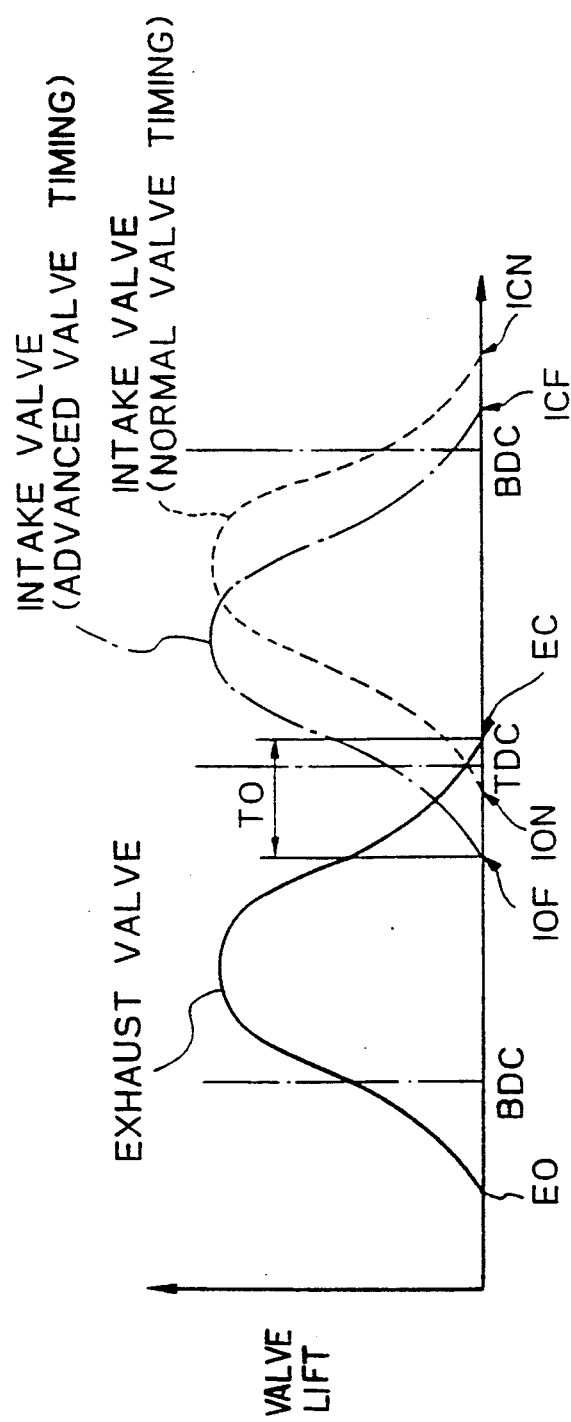

FIG. 4 illustrates the timings of the opening and closing of the intake valve and the exhaust valve, and the valve lift.

Figure 5:
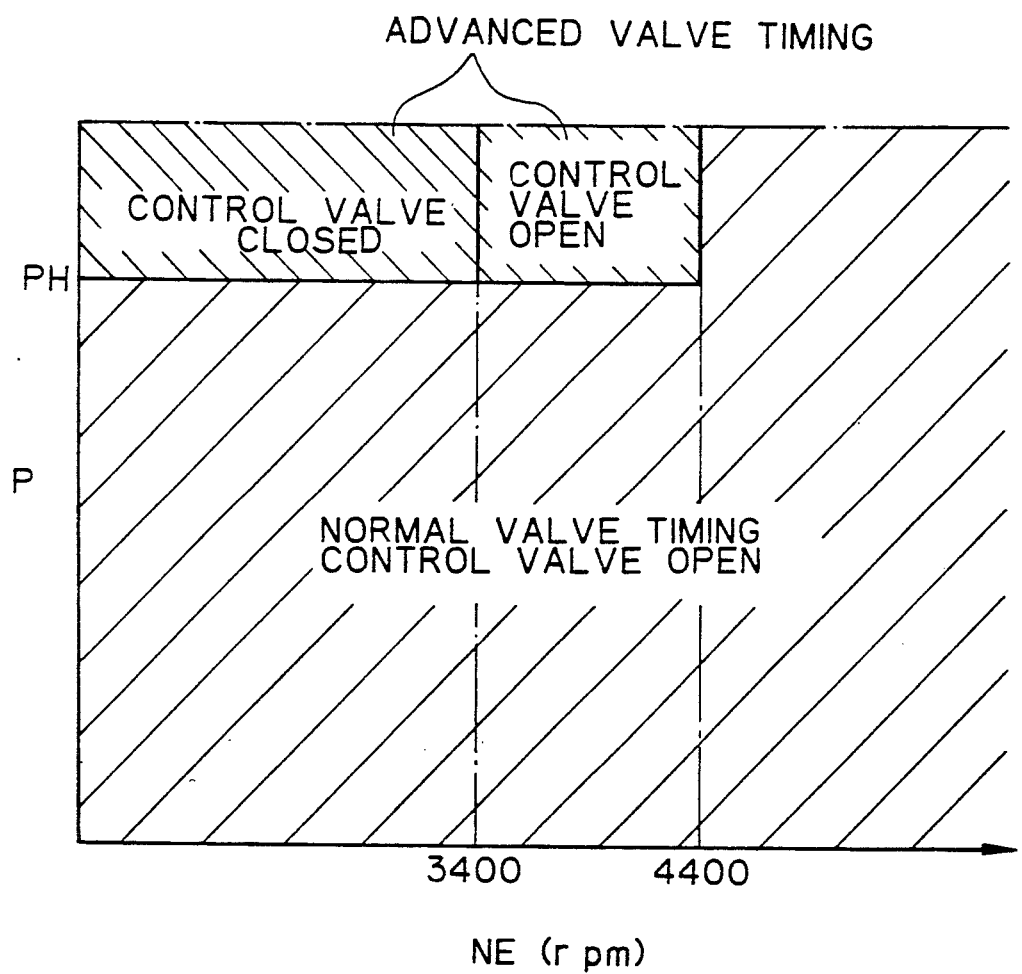
FIG. 5 is a diagram illustrating a control of the valve timing control device and the control valve.

FIG. 5 illustrates the advanced valve timing area and the normal valve timing area, wherein NE represents the engine speed and P represents an absolute pressure in the intake pipe. Referring to FIG. 5, in the high load area and the low and intermediate engine speed areas, the valve timing is advanced, and in the remaining area, the valve timing is the normal valve timing. In the low and intermediate load areas or high engine speed area, since the speed of the air flowing into the cylinder is high, even if the valve closing timing is retarded, air can still flow into the cylinder. Accordingly, when the valve closing timing is retarded, a large amount of air flows into the cylinder. At this time, since the period for which the intake valve is open is constant, the valve opening timing is also retarded. On the other hand, in the high load area and low and intermediate engine speed areas, since the speed of the air flowing into the cylinder is relatively low, the valve closing timing must be advanced to prevent a reverse flow of air. At this time, the valve opening timing is also advanced, since the period for which the intake valve is open is constant.

Nevertheless, when the valve timing is advanced, a valve overlapping period during which both the intake valve and the exhaust valve are open is prolonged, and thus a problem arises in that an amount of air fed into the cylinder during an intake stroke is reduced, because burnt gas remaining in the cylinder flows backward toward the intake port. When the valve timing is normal, since the valve overlapping period is short, there is little reduction of an amount of air fed into the cylinder during the intake stroke.

Therefore, in this embodiment, when the valve timing is advanced and the engine speed is low, the control valve 19 is closed, whereby the exhaust gas pulsation is reflected at the merging portion 14 and returned to the exhaust port in the form of a vacuum, during the latter half of the valve overlapping period.

When the valve timing is advanced and the engine speed is an intermediate speed, the control valve 19 is opened and the exhaust gas pulsation is reflected at the connecting portion connected to the communication pipe 18 and returned to the exhaust port in the form of a vacuum, during the latter half of the valve overlapping period.

As mentioned above, when the valve timing is advanced and the engine speed is in the low and intermediate areas. The exhaust gas pulsation is reflected and returned to the exhaust port in the form of a vacuum, during the latter half of the valve overlapping period, and thus burnt gas in the cylinder can be drawn out into the exhaust port by the vacuum in the exhaust port, whereby the amount of air fed into the cylinder is increased, and therefore, the output power of the engine is increased.

When the valve timing is normal, the control valve 19 is opened. Namely, at the normal valve timing, since the valve overlapping period is short, little of the burnt gas remaining in the cylinder flows backward toward the intake port, and accordingly, the control valve 19 is not controlled in accordance with engine speed. Therefore, at the normal valve timing, the control valve 19 is usually opened. Accordingly, since the control valve 19 is not operative at the normal valve timing, the service life of the control valve 19 can be extended.

Figure 6:
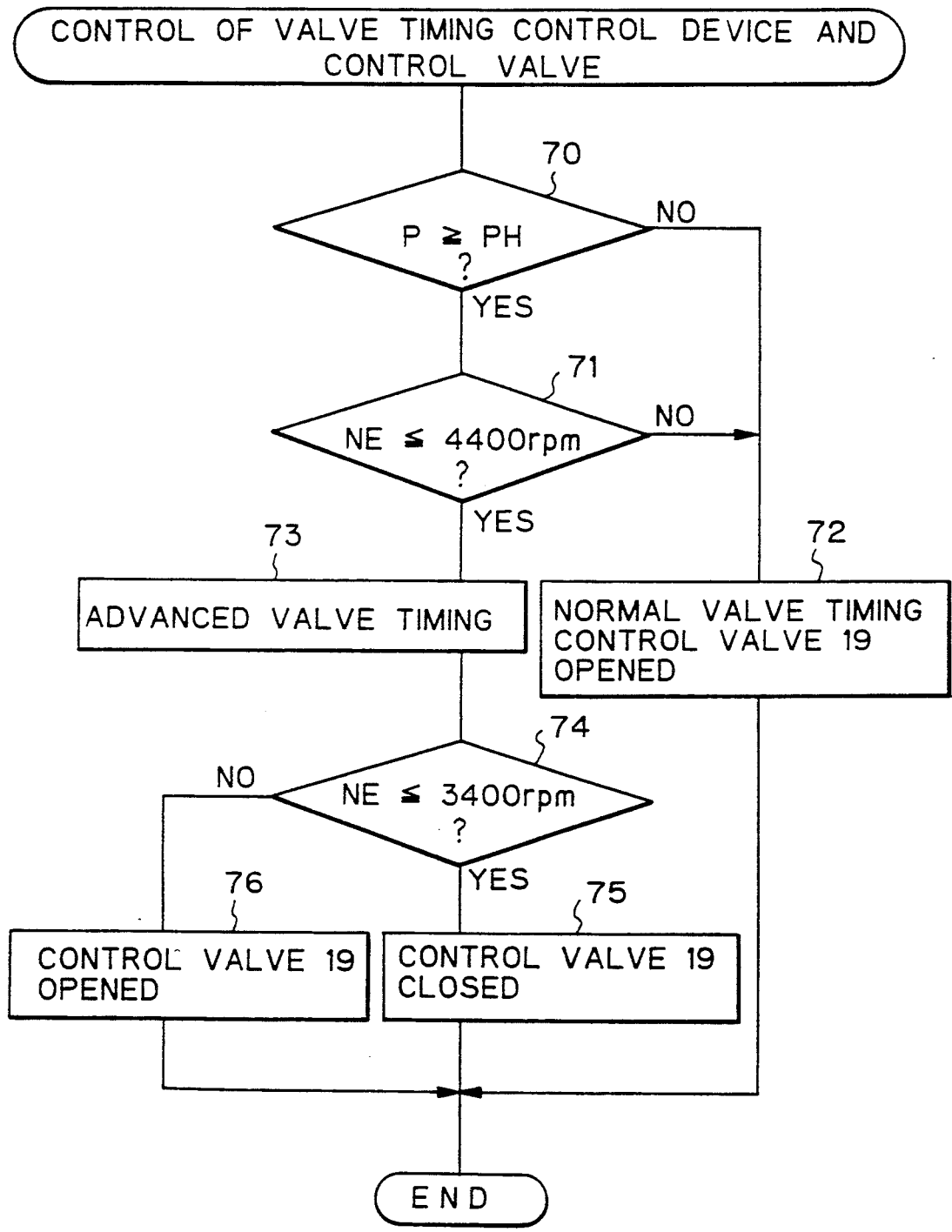
FIG. 6 is a flow chart for controlling the valve timing control device and the control valve.

FIG. 6 illustrates a routine for controlling the valve timing control device 11 and the control valve 19. This routine is processed by sequential interruptions executed at predetermined intervals.

Referring to FIG. 6, in step 70, it is determined whether or not the absolute pressure P in the intake pipe is equal to or larger than the predetermined pressure PH, i.e., the engine load is high. When P<PH, i.e., the engine load is not high, the routine goes to step 72. In step 72, the valve timing is made the normal valve timing and the control valve 19 is opened. Conversely, when P≧PH, i.e., the engine load is high, the routine goes to step 71. In step 71, it is determined whether or not the engine speed NE is equal to or less than 4400 rpm. When NE>4400 rpm, the routine goes to step 72. Conversely, when NE≦4400 rpm, the routine goes to step 73 and the valve timing is advanced. Then, in step 74, it is determined whether or not the engine speed NE is equal to or less than 3400 rpm. When NE≦3400 rpm, i.e., the engine speed is low, the routine goes to step 75 and the control valve 19 is closed. Conversely, when NE>3400 rpm, i.e., the engine speed is not low, the routine goes to step 76 and the control valve 19 is opened.

Figure 7:
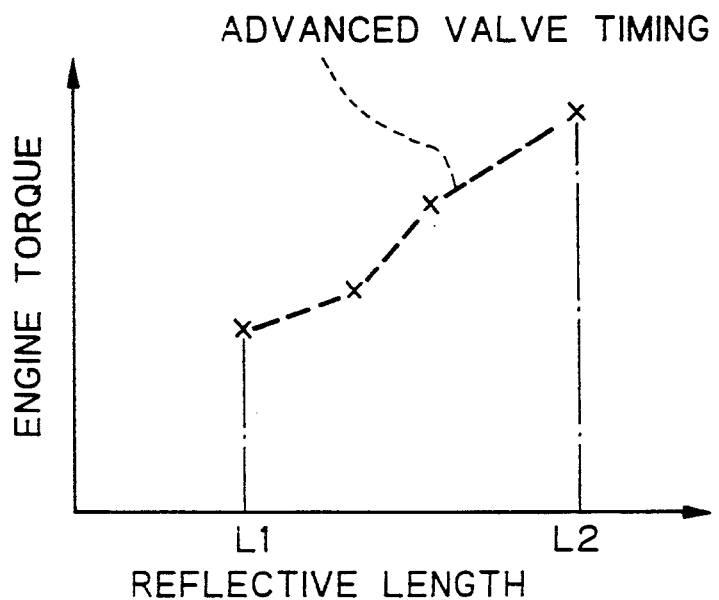
FIG. 7 illustrates the relationship between the reflective length and the engine torque.

FIG. 7 illustrates a result of an experiment carried out to determine the relationship between the reflective length in the exhaust passage from the exhaust valve to the reflective position of the exhaust gas pulsation and the engine torque when the engine speed is low. When the control valve 19 is opened, the reflective length is L1, and when the control valve 19 is closed, the reflective length is L2. When the engine speed is low and the valve timing is advanced, the engine torque can be greatly increased by closing the control valve 19 (i.e., the reflective length is L2).

Figure 8:
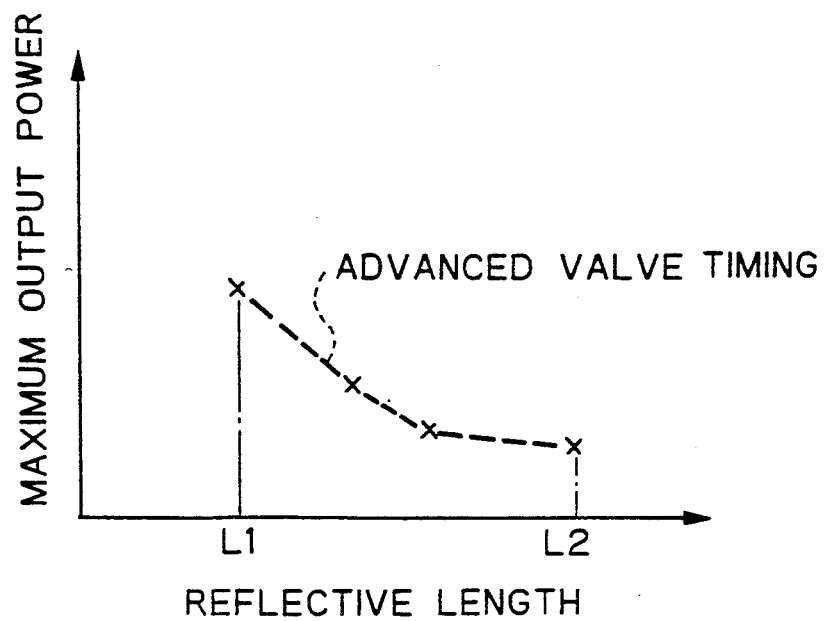
FIG. 8 illustrates the relationship between the reflective length and the maximum output power.

FIG. 8 illustrates a result of an experiment carried out to determine the relationship between the reflective length and the maximum output power when the engine speed is an intermediate speed. When the valve is advanced, the maximum output power can be greatly increased by opening the control valve 19 (i.e., the reflective length is L1).

Figure 9:
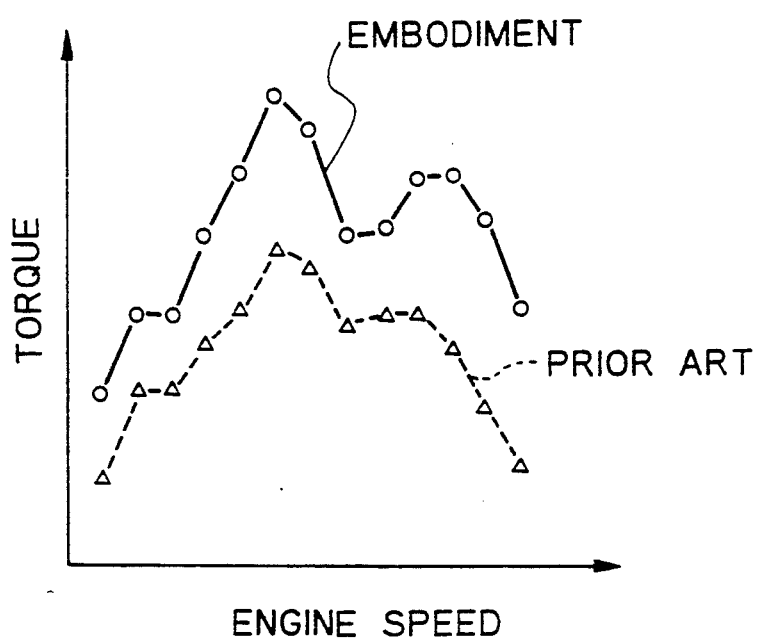
FIG. 9 illustrates the relationship between the engine speed and the torque, in the embodiment according to the present invention and in the prior art.

FIG. 9 illustrates a torque obtained by this embodiment and a torque obtained by a prior art, and as can be seen from FIG. 9, in this embodiment the torque can be greatly increased over the full range of the engine speed.

Note, in this embodiment, although only one communication pipe 18 is provided, a plurality of communication pipes each having a control valve, respectively, may be provided.

Furthermore, in this embodiment, although the first and second merging pipes 12 and 13 are merged, these first and second merging pipes 12 and 13 need not be merged, and in this case, each of the merging pipes 12 and 13 will have a reflecting portion, respectively.

Although the invention has been described with reference to specific embodiments chosen for purposes of illustration, it should be apparent that numerous modifications could be made thereto by those skilled in the art without departing from the basic concept and scope of the invention.

We claim:

1. An internal combustion engine having an intake valve and an exhaust valve, comprising:

valve overlapping period control means for controlling a valve overlapping period during which both the intake valve and the exhaust valve are open; and equivalent length adjustment means for controlling an equivalent length of an exhaust passage necessary to cause an exhaust gas pulsation to return to an exhaust port in the form of a vacuum during said valve overlapping period, to reduce said equivalent length as an engine speed increases when said valve overlapping period is longer than a predetermined period, and for stopping a control of said equivalent length when said valve overlapping period is shorter than said predetermined period, said exhaust passage having a rapidly increased sectional area portion, said equivalent length being represented by a length from the exhaust valve to said rapidly increased sectional area portion, and said equivalent length adjustment means controlling the position of said rapidly increased sectional area portion to thereby reduce said equivalent length as the engine speed increases when said valve overlapping period is longer than said predetermined period, and stopping a control of the position of said rapidly increased sectional area portion when said valve overlapping period is shorter than said predetermined period.

2. An internal combustion engine according to claim 1, wherein said exhaust passage comprises two merging passages which merge at a merging portion, and said rapidly increased sectional area portion is represented by said merging portion.

3. An internal combustion engine according to claim 2, wherein said exhaust passage has a plurality of said merging portions, each merging portion having a control valve, respectively, for opening and closing said merging portion, and said equivalent length adjustment means controls said control valves to reduce said equivalent length as the engine speed increases when said valve overlapping period is longer than said predetermined period, and stops the control of said control valve when said valve overlapping period is shorter than said predetermined period.

4. An internal combustion engine according to claim 1, wherein said valve overlapping period control means is represented by a valve timing control device for controlling a timing of an opening and closing of the intake valve.

5. An internal combustion engine according to claim 4, wherein said valve timing control device advances said timing of the opening and closing of the intake valve when an engine load is high and an engine speed is in low and intermediate areas.

* * * * *